United States Patent

Arai

[11] Patent Number: 6,153,883
[45] Date of Patent: Nov. 28, 2000

[54] ENERGY DISPERSIVE SEMICONDUCTOR X-RAY DETECTOR WITH IMPROVED SILICON DETECTOR

[75] Inventor: Shigetoshi Arai, Miyanohigashi-machi, Japan

[73] Assignee: Horiba, Ltd., Kyoto, Japan

[21] Appl. No.: 09/036,396

[22] Filed: Mar. 6, 1998

[30] Foreign Application Priority Data

Mar. 7, 1997 [JP] Japan .................................. 9-070438

[51] Int. Cl.[7] .................................................. G01T 1/24
[52] U.S. Cl. ............................ 250/370.15; 250/370.01; 250/370.05; 250/370.06
[58] Field of Search .................... 250/370.15, 370.05, 250/370.01, 370.06

[56] References Cited

U.S. PATENT DOCUMENTS 4,893,016  1/1990  Katagiri .
5,281,822  1/1994  Albrecht et al. .................. 250/370.05

FOREIGN PATENT DOCUMENTS 642178     3/1995  European Pat. Off. .
63-195584  9/1987  Japan .
1393627    5/1975  United Kingdom .
1559664    1/1990  United Kingdom .

OTHER PUBLICATIONS

Large Area, Low Capacitance Si (Li) Detectors for High Rate X-Ray Applications; Oct. 1992; C.S. Rossington, P.M. Fine, and N.W. Madden, Engineering Science Department, Engineering Division, Lawrence Berkeley Laboratory, University of California, Berkeley, CA 94720; supported by Office of Energy Research, Office of Biological and Environmental Research, Analytical Technology Division of the U.S. Department of Energy under Contract No. DE-AC03-76SF00098.

Primary Examiner—Constantine Hannaher
Assistant Examiner—Andrew Israel
Attorney, Agent, or Firm—Price and Gess

[57] ABSTRACT

An energy dispersive X-ray detector assembly has a detector element of a high-purity silicon substrate with a pair of electrodes, one on either side of the silicon substrate, to create an depletion layer in the silicon substrate when an electric field is created between the electrodes to enable the detection of X-rays. The silicon substrate has a resistivity of at least 10 kΩ·cm and a thickness in the incident direction of the X-rays of approximately 3 to 5 mm. A refrigerator system, such as a closed cycle gas circulation refrigerator, can be used to cool the detector element to enable the provision of a compact detector assembly.

15 Claims, 6 Drawing Sheets

ENERGY DISPERSIVE SEMICONDUCTOR X-RAY DETECTOR WITH IMPROVED SILICON DETECTOR

BACKGROUND OF THE INVENTION

1. Field of the Invention

The present invention relates to an energy dispersive semiconductor X-ray detector (hereinafter called "EDS detector") which can be used, for example, in combination with an electron microscope to provide an energy dispersive type elemental analyzer such as an X-ray micro analyzer for measuring characteristic X-rays excited by electron beams and emitted from a sample, or a fluorescent X-ray analyzer that measures X-ray excitation.

2. Description of Related Art

EDS detectors have been used in energy dispersive type elemental analyzers requiring high resolution and they have incorporated a lithium drift type silicon semiconductor X-ray detector (Si(Li) detector). The advantages of this type of Si(Li) detector reside in its ability to provide high resolution, capability to simultaneously measure a large number of characteristic X-rays, and determine a spectrum of energy. A problem that has occurred, however, in a Si(Li) detector is that the lithium ions that are impregnated into the silicon to create an intrinsic detection region in the conventional detectors, however, may also continue inside the silicon as a result of thermal diffusion, thereby the characteristics of the detection can deteriorate and it is necessary to utilize a constant cooling system, for example, with liquid nitrogen, to combat this problem of thermal drift.

Reference can be had to FIG. 5 to show a conventional EDS detector wherein a cryostat 51 is provided so that it can ensure that the Si(Li) detection element 55 will be isolated from the external atmosphere. The cryostat 51 is connected to a Dewar 53 that contains liquid nitrogen 52 and a cold finger 54 having an L-letter shaped configuration is connected to and thermally linked to the Dewar 53, for example, by welding at one end, and at the other end, it supports not only the Si(Li) detection element 55, but also a FET 56 to provide a preamplification for an output signal. A window 57 is provided to permit X-rays 58 to penetrate through the window and enter the Si(Li) detection element 55. The inside of the cryostat can be maintained at a vacuum to help isolate the Si(Li) detection element 55 from atmospheric temperature problems.

The advantages of this conventional EDS detector shown in FIG. 5 is that it can prevent the thermal diffusion of lithium and decrease noise at the initial stages of the Si(Li) detection element 55 and the FET 56 as a result of the cooling by the liquefied nitrogen 52. A disadvantage is that it requires daily maintenance in order to replace the liquid nitrogen 52 that may evaporate.

Attempts have been made to replace the liquid nitrogen by using a small-size gas circulation system refrigerator such as a Joule-Thomson system or a pulse-tube type system. While such small-size gas circulation system refrigerators provide sufficient refrigeration capacity without a mechanical drive at its low temperature generation portion and thereby provides low vibration, easy maintenance and high reliability over a longtime period of operation, it still requires an AC power supply and any interruption of the power supply, such as a power failure or the need to transit the apparatus, can cause deterioration of the properties of the detection elements. To prevent this occurrence, it is frequently required that a standby power supply, such as batteries, be also installed, with a result of increase in size and cost.

Accordingly, there is still a desire within this industry to improve the performance of semiconductor X-ray detector systems.

OBJECTS AND SUMMARY OF THE INVENTION

The present invention provides an improved EDS detector that maintains excellent resolution while being both compact and economical.

The present invention his discovered that a high-purity silicon detection element can be configured to be used as an X-ray detection member in the EDS detector and can be particularly designed to accommodate a cooling of the X-ray detection member by a small-size gas circulation type refrigerator. The high-purity silicon detection element comprises a high-purity n-type Si wafer of, for example, 2–5 mm in. thickness and preferably with a specific resistivity of 30 $k\Omega \cdot cm$ or greater to provide a detection layer or an depletion layer when subject to an appropriate electric field. By configuring such a high-purity silicon wafer into a detection element with an intrinsic exhaustion region of sufficient thickness, it is possible to measure the incident X-rays even if the conventional Li ion drift is not being used. The detection layer permits the incoming X-rays to ionize the silicon atoms in the depletion layer and the effect on the energy applied to create the electric field is a measure of the energy of the X-rays.

Additionally, the high-purity silicon detection element will not be subject to a deterioration of characteristics even if a small-size gas circulation refrigerator does not operate due to a power failure and cooling is unable to be obtained with a rise in temperature in the vacuum. Thus, it is possible to do away with any standby power supply, such as batteries, etc., and the equipment can be maintained in a compact configuration since it is not necessary to use the conventional Dewar for maintaining an application of liquid nitrogen.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide an improved high-purity silicon detector for measuring incident X-rays.

Figure 1:
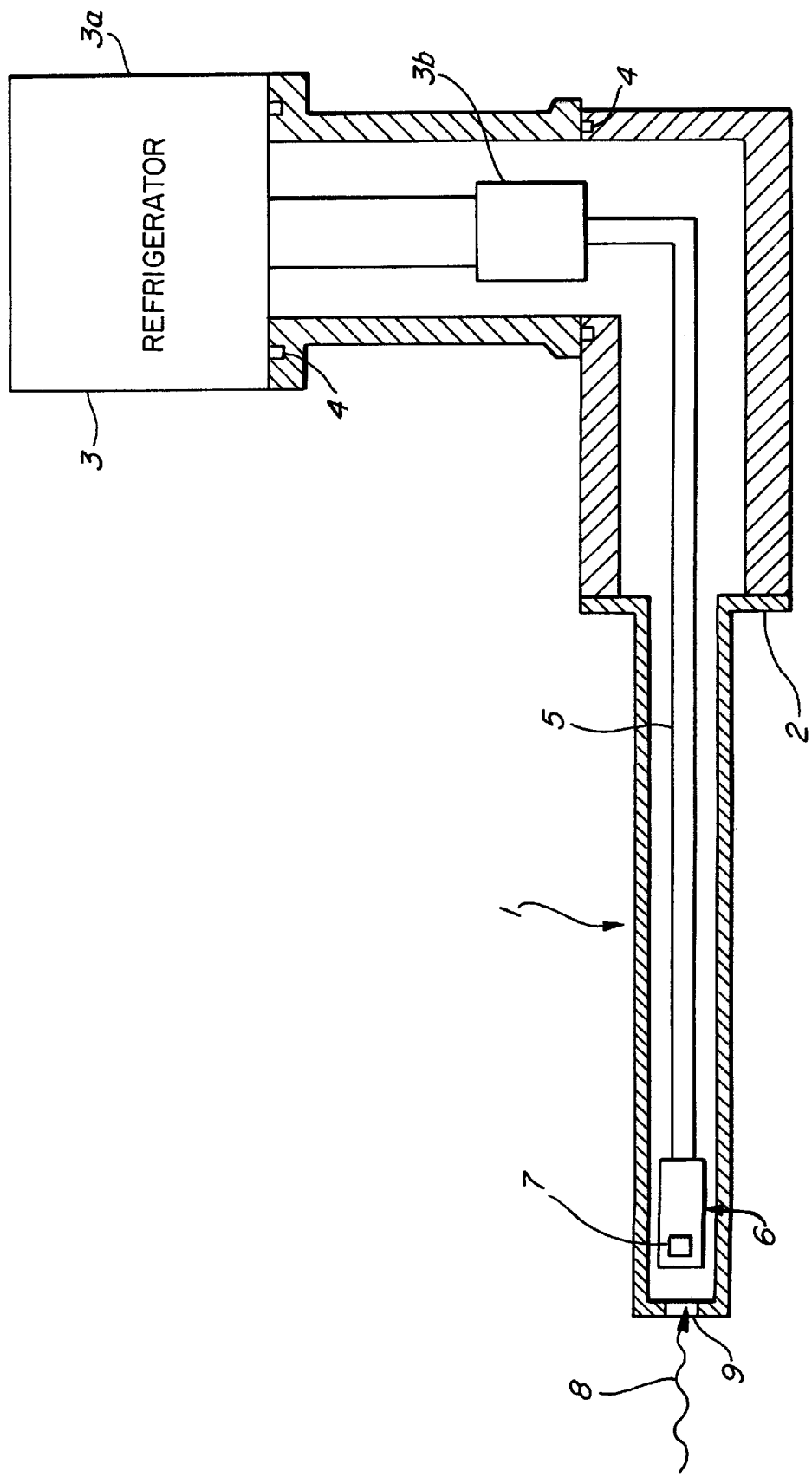
FIG. 1 is a schematic cross-sectional view showing the configuration of an EDS detector according to the present invention.
Figure 2:
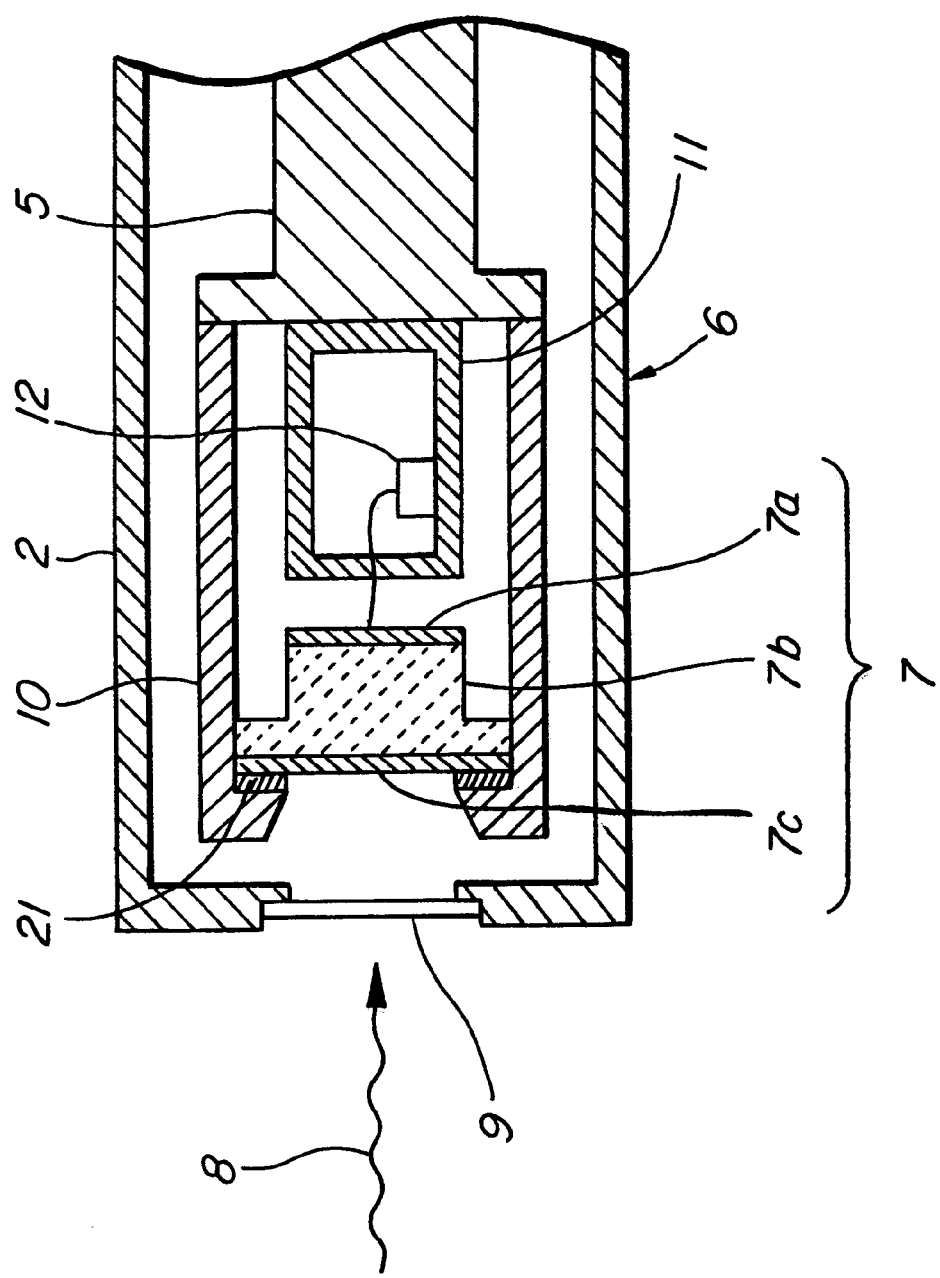
FIG. 2 is a schematic cross-sectional partial view showing the operative portion of the EDS detector arrangement.

Referring to FIGS. 1 through 3, features of the present invention are provided. FIG. 1 schematically discloses a configuration of an EDS detector 1 according to the present invention. An L-letter shaped cryostat 2 is utilized to isolate the detector from an external atmosphere, while at the same time holding the operative elements in a vacuum. A pulse tube refrigerator is installed at the upper end portion of the cryostat 2, and a cryogenic portion 3b is extended from the main body portion of 3a to the inside of the cryostat 2. The pulse tube refrigerator 3 is provided with sufficient refrigeration capacity, e.g., 10W, while at the same time isolating any mechanical drive section vibrations from the low temperature generating section to thereby achieve a simple construction as well as maintaining an extremely low vibration structure. Thus, the pulse tube refrigerator 3 ensures high reliability for a long term operation with easy maintenance. Sealing members 4 are used to seal the pulse tube refrigerator 3 to the cryostat 2 to isolate the cryogenic portion 3b.

Mounted within the cryostat 2 is a cold finger 5 which comprises a material having excellent heat conductivity such as copper, etc. The cold finger 5 is formed in, for example, an L-letter shape and has one end thermally connected to the cryogenic portion 3b of the pulse tube refrigerator 3. A detection element section 6 is mounted to the other end of the cold finger 5 so that it is thermally connected to the cold finger 5. An X-ray detection element 7 which forms the principal component member of the detection element section 6 is provided on the front surface of the cold finger 5 adjacent an X-ray window 9 to permit X-rays 8 to penetrate and enter the detector element section 6.

Reference can be made to FIG. 2 to disclose an enlarged view of the configuration of the detection element section 6. A detection element holder 10 is provided with an open configuration adjacent the X-ray window 9 so that it can mount the X-ray detection element 7 between parallel support members. The element holder 10 is installed to be directly thermally connected to the cold finger 5. The X-ray detection element 7 consists of a high-purity Si wafer having from the incident X-ray side, a high voltage electrode 21, a p electrode, 7c, a detector element proper 7b, an electrode or a signal take-out electrode 7a. A low noise FET package 11 is mounted behind X-ray detection element 7 and is also thermally connected to the cold finger 5. A FET 12 is connected to the signal take-out electrode 7a by means of a wire connection. The FET 12 is known in the industry and therefore is not illustrated in detail. It is connected to external equipment by an appropriate signal line not shown. Both the element holder 10 and the low noise FET package 11 comprise material with good thermal conductivity. The high-purity Si wafer or detector element 7 can be, for example, from 2–5 mm in thickness and will have a resistivity of at least 10 k$\Omega$·cm and preferably 30 to 40 k$\Omega$·cm as indicative of the purity of the silicon substrate.

Figure 6:
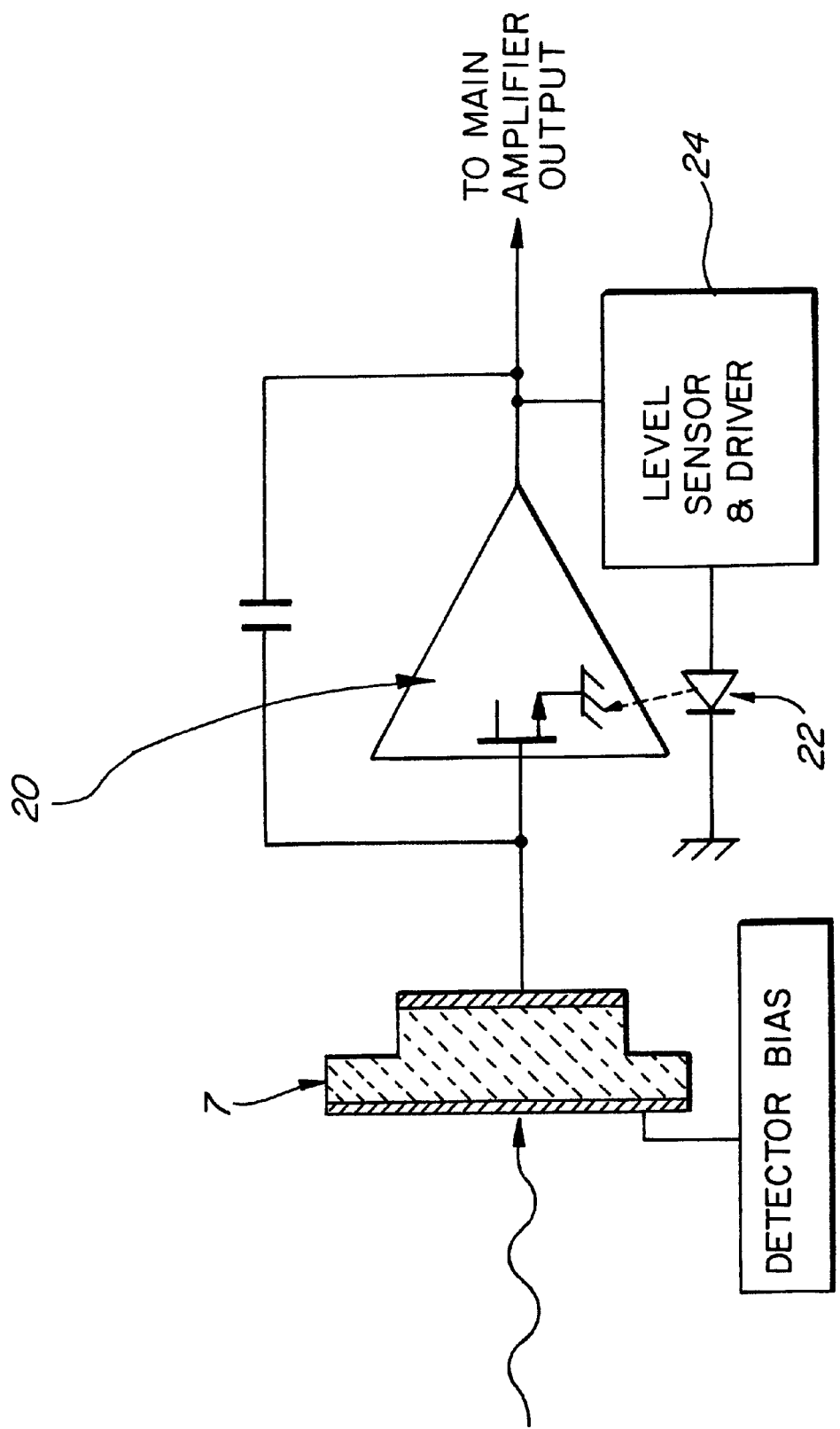
FIG. 6 is a schematic of a detector system and pre-amplifier circuit.

An example of a pre-amplifier circuit can be seen in FIG. 6. The pre-amplifier circuit includes a FET 20 with a capacitor $C_f$ and does not have a direct current-type operating point. Instead, when the pre-amplifier output reaches a predetermined constant value, light from a light-emitting diode 22 is directed onto a joint of the FET 20 by a level sensor and driver circuit 24 to reset the FET 20 so that the operating range of the pre-amplifier circuit becomes linear, thereby providing a pulsed optical feedback-type circuit with better energy resolution and totaling characteristics than a resistive feedback-type circuit. Ideally, the initial pre-amplifier circuit, along with the Si detector 26, is cooled to a temperature of approximately –200° C. in order to reduce thermal noise and increase energy resolution, e.g., with liquid nitrogen.

Figure 3A:
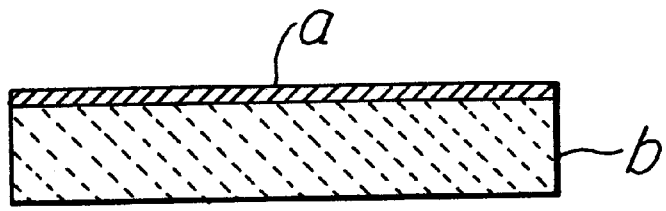
FIG. 3(A) through FIG. 3(D) are respective view showing an example of manufacturing a high-purity silicon X-ray detection element for use in an EDS detector.
Figure 3B:
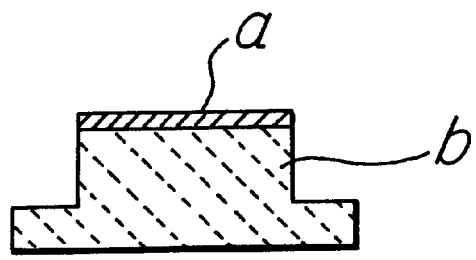
Figure 3C:
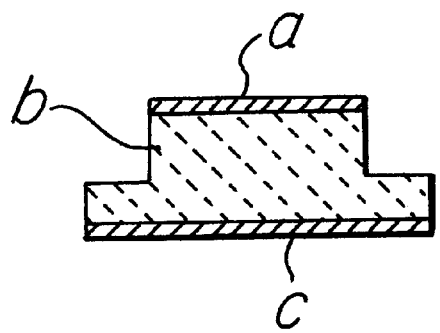

FIGS. 3(A) through 3(D) discloses the different stages of manufacturing the X-ray detection element 7 from a base material such as a high-purity Si wafer with the specific resistivity of 10 k$\Omega$·cm or greater. On one surface of the high specific resistance base material of silicon an N' electrode a is formed, see FIG. 3(A). In providing the formation of the N' electrode a, a high temperature procedure, such as a phosphorus diffusion procedure, can be used because there is no fear of Li diffusion in the pure silicon substrate during the metal deposition to provide the surface barrier. Subsequently, the X-ray detection element 7 can be formed into the top hat shape shown in FIG. 3(B) by an application of ultrasonic energy to cut the pure Si wafer. This shape helps to minimize the leakage of current. Referring to FIG. 3(C), a metal material such as gold, etc., can be deposited as to form the P electrode c on the surface barrier.

Figure 3D:
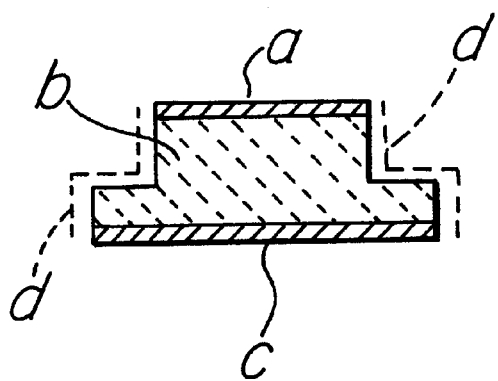

Finally, the side surfaces d shown in FIG. 3(D) can be protected to maintain the desired performance despite any temperature cycling. Thus, the surface protection that is selected not only improves the temperature-resistant cycle characteristics so that they do not deteriorate even when the X-ray detection element 7 is cooled or recovers to room temperature, but further has the effect to alleviate the influence of the surface condition of the side subject to any internal electrical field when voltage is applied. The particular protection material does not form a part of the present invention.

In an EDS detector 1 in the above embodiment, the choice of a component comprising a high-purity silicon detection element having a preferred specific resistivity of 40 k$\Omega$·cm can be used as the X-ray detection element 7 and thereby provide an intrinsic area with sufficient thickness even if the drift of Li is not present.

An ultra-pure silicon detector of the present invention has a diode structure with a preferred specific resistivity of 40 k$\Omega$·cm. By applying voltages to the electrodes at both ends of the silicon body, an depletion layer develops inside the silicon to create a sensitive layer. The sensitive layer can convert the energy from incoming X-rays into electrical signals and the X-rays which enter the depletion layer causes the silicon atoms to become ionized. Groupings of electron/hole pairs form, and the energy is dissipated. The amount of energy required to form a single electron/hole pair is approximately 3.9 eV in the case of silicon, so that the number of electron/hole pairs formed equals:

$$\frac{\text{Energy of incoming X-rays (eV)}}{3.9 \text{ (eV)}}$$

Thus, the number of groupings is proportional to the energy of the incoming X-rays. To be more precise, it is more correct to state "the energy lost by the detector" rather than "the energy of the incoming X-rays," but in practical terms, there is almost no difference between the two.

Accordingly, the electrical charge generated at this time is:

(1)×q (coulomb)

(q: 1.60×10$^{-19}$ coulomb)

For example, the electrical charge generated by a single A1 K $\alpha$ X-ray (1486 eV) is:

$$\frac{1486}{3.8} \times 1.60 \times 10^{-19} = 6.1 \times 10^{-17} \text{ (colulomb)}$$

With Si detectors, a bias voltage (around –500—–1000V is applied, and the electric field thus formed causes the charge inside the detector to be generated within about 10 nanoseconds.

Additionally, the X-ray detection element 7 comprising this high-purity silicon detection element does not cause deterioration of characteristics even when temperature raises in the vacuum and therefore, unlike the conventional Si(Li) detector, it is only required to be cooled by a pulse tube refrigerator 3 when a measurement cycle is carried out. Consequently, a standby power supply, such as batteries, etc., are not required to be installed. In the EDS detector 1, the X-ray detection element 7 is designed to be cooled by the pulse tube refrigerator 3, which can be of a compact configuration since the conventional Dewar containing liquid nitrogen is not necessary.

In a conventional EDS detector utilizing an Si(Li) detector, the Si(Li) element must be constantly ventilated by an ion pump or periodically ventilated by an vacuum pump in an electron microscope configuration because the performance deteriorates when the vacuum of the cryostat starts to degrade in a room temperature condition. The ion pump has to be backed up by a battery to also cope with any possible power failure and, of course, the battery has a limited service life and capacity, and is not able to be used if there is a long-term power failure.

Figure 4:
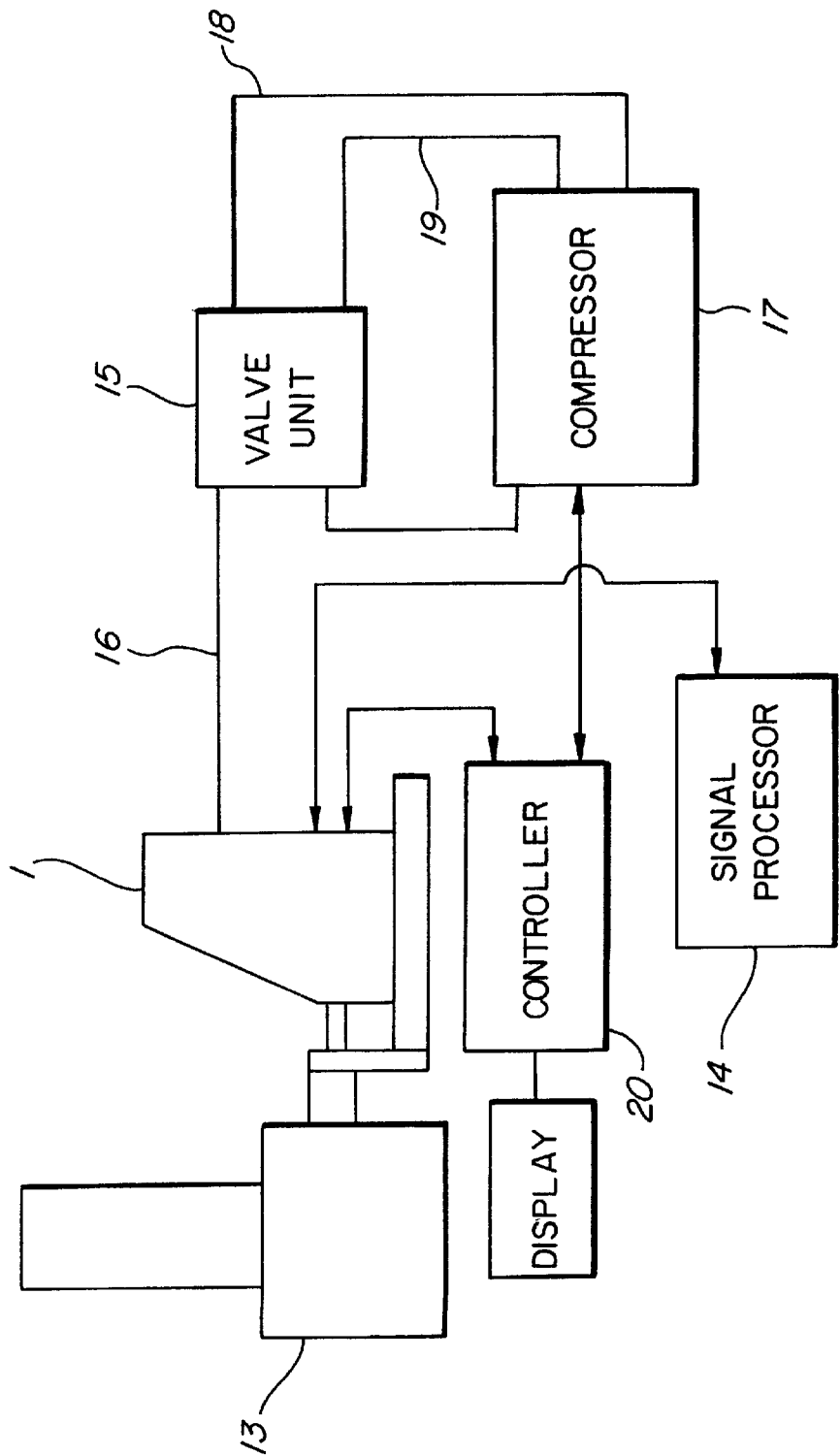
FIG. 4 is a schematic illustration showing one example of a configuration of equipment incorporating an EDS detector.
Figure 5:
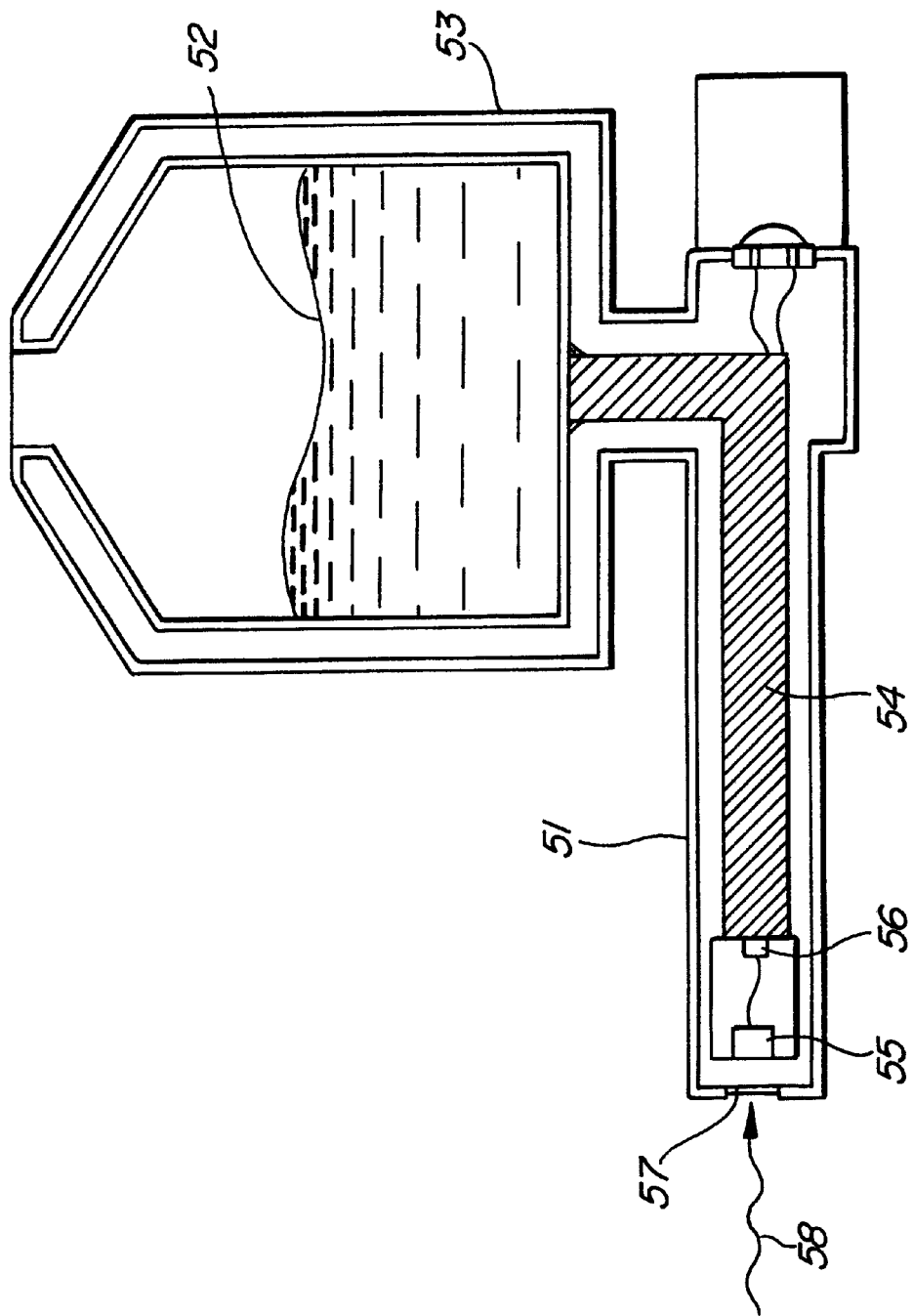
FIG. 5 is a schematic cross-sectional view showing a conventional EDS detector with a Dewar.

FIG. 4 shows a schematic arrangement of an element analyzer combining the EDS detector 1 of the present invention with a small-size pulse tube system as a refrigerator for a scanning electron microscope 13. A signal processor section 14 of the element analyzer supplies power to the EDS detector 1 and at the same time processes signals based on the detection signals from the EDS detector 1 attached to the scanning electron microscope 13. A connecting pipe 16 extends from the EDS detector 1 to a valve selector unit 15. A compressor 17 for providing the refrigeration is also connected to the valve selector unit 15 via a high-pressure helium piping system 18 and a low-pressure helium piping 19 to generate a cooling effect for the EDS detector 1. A controller 20 can control both the EDS detector 1 and the operation of the compressor 17 and can provide a display of the X-ray measurements. For example, the controller 20 can ensure that the compressor 17 need only be operated to provide an appropriate temperature during a measurement mode of operation.

An element analyzer configured in this manner has an extremely compact overall configuration and has a further advantage of being free from the necessity of using liquid nitrogen as the cooling system.

It should be appreciated that the present invention is not limited to the above embodiments and components mentioned herein, but can also use a small-size gas circulation type refrigerators of other systems such as the Joule-Thomson system for a refrigerator, and in such an event, similar effects can be achieved.

The EDS detector of the present invention, by adopting an X-ray detection element comprising a high-purity silicon detection element, can provide excellent resolution, while at the same time does not require the constant cooling of conventional systems. The EDS detector of the present invention need only be cooled by a small-size gas circulation refrigerator during the measurement cycle. Consequently, it can achieve advantages in both operability and maintainability as well as compactness as compared to conventional EDS detectors. Thus, the use of an X-ray detection element that can be cooled without using liquid nitrogen is particularly suitable to applications where there is a problem of handling liquid nitrogen such as in clean rooms.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. In an energy dispersive Z-ray detector assembly, the improvement comprising:

a detector element having a resistivity of approximately 30 kΩ·cm;

a refrigerator system for cooling the detector element; and means for cooling the detector element during an X-ray detection mode of operation.

2. The invention of claim 1 wherein the refrigerator system is a closed cycle gas circulation refrigerator.

3. The invention of claim 1 further including a first electrode on one side of the detector element and a second electrode on the other side of the detector element and means for providing voltage to each electrode to form an depletion layer inside the silicon to detect the X-rays.

4. The invention of claim 3 wherein the thickness of the silicon relative to an incident direction of the X-rays is approximately 3 to 5 mm.

5. In an energy dispersive X-ray detector assembly, the improvement of a detector element consisting of:

a silicon substrate has a resistivity of at least 10 kΩ·cm; and a pair of electrodes, one on either side of the silicon substrate to create a depletion layer in the silicon substrate when an electric field is created between the electrodes to enable the detection of X-rays.

6. The invention of claim 5 wherein the thickness of the silicon substrate relative to an incident direction of the X-rays is approximately 3 to 5 mm.

7. The invention of claim 5 wherein the silicon substrate has a resistivity within the range of 30 kΩ·cm to 40 kΩ·cm.

8. The invention of claim 7 further including side protective layers extending across the silicon substrate between the pair of electrodes to improve temperature-resistant cycle deterioration characteristics.

9. A compact energy dispersive X-ray detector assembly comprising:

a detector element consisting of a silicon substrate having a resistivity of at least 10 kΩ·cm and a thickness of approximately 3 to 5 mm relative to an incident direction of the X-rays;

a first electrode on one side of the detector element;

a second electrode on the other side of the detector element;

means for providing a voltage differential between the first electrode and the second electrode to form an depletion layer inside the silicon to detect X-rays;

means for cooling the detector element during a measurement mode of operation; and means for determining the amount of X-rays contacting the detector element.

10. The invention of claim 9 wherein the detector element of silicon has a resistivity of approximately 30 kΩ·cm.

11. The invention of claim 9 wherein the means for cooling is a closed cycle gas circulation refrigerator.

12. The invention of claim 11 wherein the means for providing a voltage differential in the approximate range of a negative 500 to 1,000 volts.

13. The invention of claim 11 wherein the closed cycle gas circulation refrigeration is a pulse tube refrigerator.

14. The invention of claim 11 further including a controller connected to closed cycle gas circulation refrigerator and enabling the closed cycle gas circulation refrigerator only during a measurement cycle to provide a refrigeration capacity of 10W.

15. The invention of claim 11 wherein the silicon substrate has a resistivity of approximately 40 kΩ·cm.

* * * * *